(12) United States Patent
Spielman et al.

(10) Patent No.: US 6,665,378 B1
(45) Date of Patent: Dec. 16, 2003

(54) IP-BASED NOTIFICATION ARCHITECTURE FOR UNIFIED MESSAGING

(76) Inventors: Brenda Gates Spielman, 110 Scarborough Pl., Charlottesville, VA (US) 22903; Lewis Dean Dodrill, 12401 Northlake Pl., Richmond, VA (US) 23233; Satish Joshi, 12341 Country Creek Way, Glen Allen, VA (US) 23060; Nagendran Parasu, 12613 Hidden Oaks La., Richmond, VA (US) 23233; Robert James Lockwood, 3607 Woodlynne Pl., Richmond, VA (US) 23233

(*) Notice: Subject to any disclaimer, the term of this patent is extended or adjusted under 35 U.S.C. 154(b) by 392 days.

(21) Appl. No.: 09/629,053

(22) Filed: Jul. 31, 2000

(51) Int. Cl.[7] .................. H04M 1/64; H04M 11/00; G06F 15/16; G06F 9/46; H04L 12/66

(52) U.S. Cl. .................. 379/88.12; 379/88.13; 709/318; 709/230; 370/353

(58) Field of Search .................. 379/88.12, 88.13, 379/93.24, 88.14, 88.17; 455/466, 458; 370/352, 353, 356, 395.5; 709/230, 318

(56) References Cited

U.S. PATENT DOCUMENTS

| | | | |
|---|---|---|---|
| 4,837,798 A | | 6/1989 | Cohen et al. |
| 5,717,741 A | | 2/1998 | Yue et al. |
| 5,742,905 A | * | 4/1998 | Pepe et al. .................. 455/461 |
| 5,764,747 A | | 6/1998 | Yue et al. |
| 6,092,102 A | * | 7/2000 | Wagner .................. 340/7.29 |
| 6,212,265 B1 | * | 4/2001 | Duphorne .................. 379/142.15 |
| 6,233,317 B1 | * | 5/2001 | Homan et al. .................. 379/88.05 |
| 6,233,318 B1 | * | 5/2001 | Picard et al. .................. 379/88.17 |
| 6,333,973 B1 | * | 12/2001 | Smith et al. .................. 379/88.12 |
| 6,335,966 B1 | * | 1/2002 | Toyoda .................. 379/100.06 |
| 6,389,276 B1 | * | 5/2002 | Brilla et al. .................. 455/413 |
| 6,424,647 B1 | * | 7/2002 | Ng et al. .................. 370/352 |
| 6,438,217 B1 | * | 8/2002 | Huna .................. 379/88.14 |
| 6,445,694 B1 | * | 9/2002 | Swartz .................. 370/352 |
| 6,446,115 B2 | * | 9/2002 | Powers .................. 709/206 |
| 6,446,118 B1 | * | 9/2002 | Gottlieb .................. 709/217 |
| 6,466,969 B1 | * | 10/2002 | Bunney et al. .................. 709/206 |
| 6,539,077 B1 | * | 3/2003 | Ranalli et al. .................. 379/67.1 |
| 6,549,612 B2 | * | 4/2003 | Gifford et al. .................. 379/67.1 |
| 6,560,318 B1 | * | 5/2003 | Spielman et al. .................. 379/88.12 |

OTHER PUBLICATIONS

Oxford University, Open Standards and Open Source Source Software, p. 2.*

* cited by examiner

*Primary Examiner*—Fan Tsang
*Assistant Examiner*—Joseph Phan
(74) *Attorney, Agent, or Firm*—Leon R. Turkevich

(57) ABSTRACT

A notification architecture utilizes multiple processes configured for managing notification operations based on reception of SMTP-based messages within IMAP based message stores. The notification architecture includes a notification process, configured for receiving notification messages for respective subscribers from messaging sources according to a prescribed open protocol such as Internet Protocol. The notification process accesses subscriber profile information from an open protocol-based subscriber directory based on the received notification messages. The notification process determines, for each received notification message, the subscriber's notification preference based on the accessed profile information, and selectively outputs a notification delivery message according to a prescribed open protocol to at least one notification delivery process within the notification architecture based on the subscriber's notification preference. The notification process may have access via the prescribed open protocol to multiple notification delivery processes, each configured for outputting a notification to a subscriber's notification device according to a corresponding device protocol. Hence, subscribers may be notified of events according to their respective preferences, including subscriber device type, or time of notification.

58 Claims, 4 Drawing Sheets

IP-BASED NOTIFICATION ARCHITECTURE FOR UNIFIED MESSAGING

BACKGROUND OF THE INVENTION

1. Field of the Invention

The present invention relates to message notification systems configured for sending a notification message to a subscriber having received a message.

2. Description of the Related Art

The evolution of the public switched telephone network has resulted in a variety of voice applications and services that can be provided to individual subscribers and business subscribers. Such services include voice messaging systems that enable landline or wireless subscribers to record, playback, and forward voice mail messages. However, the ability to provide enhanced services to subscribers of the public switched telephone network is directly affected by the limitations of the public switched telephone network. In particular, the public switched telephone network operates according to a protocol that is specifically designed for the transport of voice signals; hence any modifications necessary to provide enhanced services can only be done by switch vendors that have sufficient know-how of the existing public switched telephone network infrastructure.

For example, existing messaging systems such as voice mail messaging systems rely on a proprietary notification system that has limited adaptability to expanded notification schemes. For example, the simplest type of notification system involves a message waiting indicator on a telephone connected to a private branch exchange (PBX), where the PBX asserts a message waiting indicator signal in response to receiving a proprietary command from a connected voice mail system. A more advanced system may initiate a page to a subscriber's pager indicating reception of the stored voice message. In each of these cases, however, the notification process necessarily relies on the proprietary features of the PBX and the associated voice mail system.

Wireless based communications system have voice messaging systems that notify a wireless subscriber via his or her wireless telephone of a stored voicemail message. Such notification systems are beneficial in cases where the subscriber was making another call on his or her wireless telephone, or if the subscriber's wireless telephone was previously unavailable due to being turned off or outside a service area. Such wireless based communications systems, however, rely on the proprietary features of the wireless indications system in order to notify the wireless subscriber.

Short Message Services (SMS) have been implemented in wireless telephone communications systems as a way to send a message to a subscriber's cellular phone to notify the subscriber that he or she has received a new voice mail. A messaging server, also referred to as a Short Message Service Center (SMSC), is configured for receiving a notification message from a messaging source according to Short Message Peer to Peer Protocol (SMPP). The messaging source may be, for example, a voice mail system, a paging system, or an e-mail interface resident within the wireless telephone communications system. The SMSC, in response to receiving the notification message from the messaging source, transmits a short message to the cellular phone based on the destination telephone number specified within the notification message. However, this arrangement still provides only limited flexibility in enabling different sources to send a notification to a cellular phone. Hence, the above-described arrangement still lacks sufficient flexibility and scalability to enable messaging subscribers to select the means for notification.

Unified communications systems are under development as a way of enhancing messaging services for users such as wireless telephone subscribers. A disadvantage of unified communications systems implemented as enhanced versions of the voice mail system, paging system, or e-mail interface resident within the wireless telephone communications system is that such implementation requires detailed knowledge of the proprietary protocols associated with the voice mail systems. Hence, such implementations are available only from switch vendors having knowledge of the proprietary protocols.

Use of a unified communications system implemented independent of the existing proprietary voice mail systems enables service providers to use scalable and distributed systems using recognized communication protocols. Hence, the service providers may use such unified communications systems across multiple platforms, independent of protocol, for storage of various types of messages, for example voice messages, facsimile, and e-mail stored in a centralized messaging store. However, the problem still remains that there exists several different types of notification devices, such as a pager, a phone indicator light, stutter dial tone, facsimile, and telephone. Moreover, for each message that enters a messaging store, one or more subscribers may need to be notified over one or more different notification devices.

SUMMARY OF THE INVENTION

There is a need for an arrangement that provides an open standards-based architecture for delivering notification for unified messaging systems over a broad range of notification devices.

There also is a need for an arrangement that provides a scalable notification architecture that can provide notification to subscribers via subscriber-selected devices according to subscriber-selected notification requirements.

These and other needs are attained by the present invention, where a notification process, configured for receiving notification messages for respective subscribers from messaging sources according to a prescribed open protocol such as Internet Protocol, accesses subscriber profile information from an open protocol-based subscriber directory based on the received notification messages. The notification process determines, for each received notification message, the subscriber's notification preference based on the accessed profile information, and selectively outputs a notification delivery message according to a prescribed open protocol to at least one notification delivery process based on the subscriber's notification preference. The notification process may have access via the prescribed open protocol to multiple notification delivery processes, each configured for outputting a notification to a subscriber's notification device according to a corresponding device protocol. Hence, subscribers may be notified of events according to their respective preferences, including subscriber device type, or time of notification.

One aspect of the present invention provides a method in a server. The method includes obtaining a notification message having been sent from a notification source according to a first open network protocol, the notification message specifying at least one notification recipient and notification information. The method also includes accessing a subscriber directory, according to a second open network protocol, for subscriber attribute information specifying subscriber. notification preference for the specified at least one notification recipient, generating, based on the subscriber notification preference, at least one notification delivery message that specifies a destination address of a corresponding notification device for the notification recipient and at least a corresponding selected portion oft he notification information, and outputting, according to a third open network protocol, the at least one notification delivery message to a selected corresponding at least one of a plurality of notification delivery processes for delivery of the selected portion of the notification information to the notification device according to a corresponding device protocol. The obtaining of the notification message, and the accessing of a subscriber directory for subscriber notification preferences using open network protocols provides centralized management of notification delivery, enabling the supply of a notification delivery message to selected notification delivery processes based on respective device protocols. Hence, a notification source such as a voice messaging system can send a notification message in order to initiate notification delivery according to a user-selected notification preference such as an e-mail message during business hours, a cellphone during specified meeting hours, or a pager during evening hours. Moreover, the notification preference may specify multiple notification devices, independent of the nature of the notification source. Hence, a subscriber may establish notification preferences for any type of notification device, including selected notification based on the notification source.

Another aspect of the present invention provides a method comprising the steps of obtaining by a notification process a notification message having been sent from a notification source according to a first open network protocol, the notification message specifying at least one notification recipient and notification information. The method also includes accessing by the notification process a subscriber directory, according to a second open network protocol, for subscriber attribute information specifying subscriber notification preference for the specified at least one notification recipient. The method also includes generating, based on the subscriber notification preference, at least one notification delivery message that specifies a destination address of a corresponding notification device for the notification recipient and at least a corresponding selected portion of the notification information, and outputting, according to a third open network protocol, the at least one notification delivery message by the notification process to a selected corresponding at least one of a plurality of notification delivery processes. The method also includes delivering by the selected at least one notification delivery process the corresponding selected portion of the notification information to the corresponding notification device according to a corresponding device protocol. Delivering the selected portion of the notification information by the corresponding notification delivery process enables deployment of an open standards-based architecture for notifying subscribers of prescribed events, where the notification process can centrally manage distribution of notification information independent of the device protocol of the destination notification devices. In addition, each of the notification delivery processes can be independently accessed by sending a message to the corresponding notification delivery process according to the third open network protocol. Hence, notification messages can be sent to different notification devices in an open standards-based architecture, eliminating the need for configuring each notification message according to device specific protocols.

Still another aspect of the present invention provides a notification system comprising a notification process and multiple notification delivery processes. The notification process is configured for obtaining a notification message having been sent from a notification source according to a first open network protocol, each notification message specifying at least one notification recipient and notification information. The notification process also is configured for accessing a subscriber directory according to a second open network protocol for subscriber notification preference information for the at least one notification recipient. The notification process also generates at least one notification delivery message that specifies a destination address of a corresponding notification device for the notification recipient and at least a corresponding selected portion of the notification information based on the subscriber notification preference information, and outputs the at least one notification delivery message according to a third open network protocol. Each of the notification delivery processes are configured for delivering a notification to a subscriber device according to a corresponding device protocol based on a corresponding received notification delivery message.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

Figure 1:
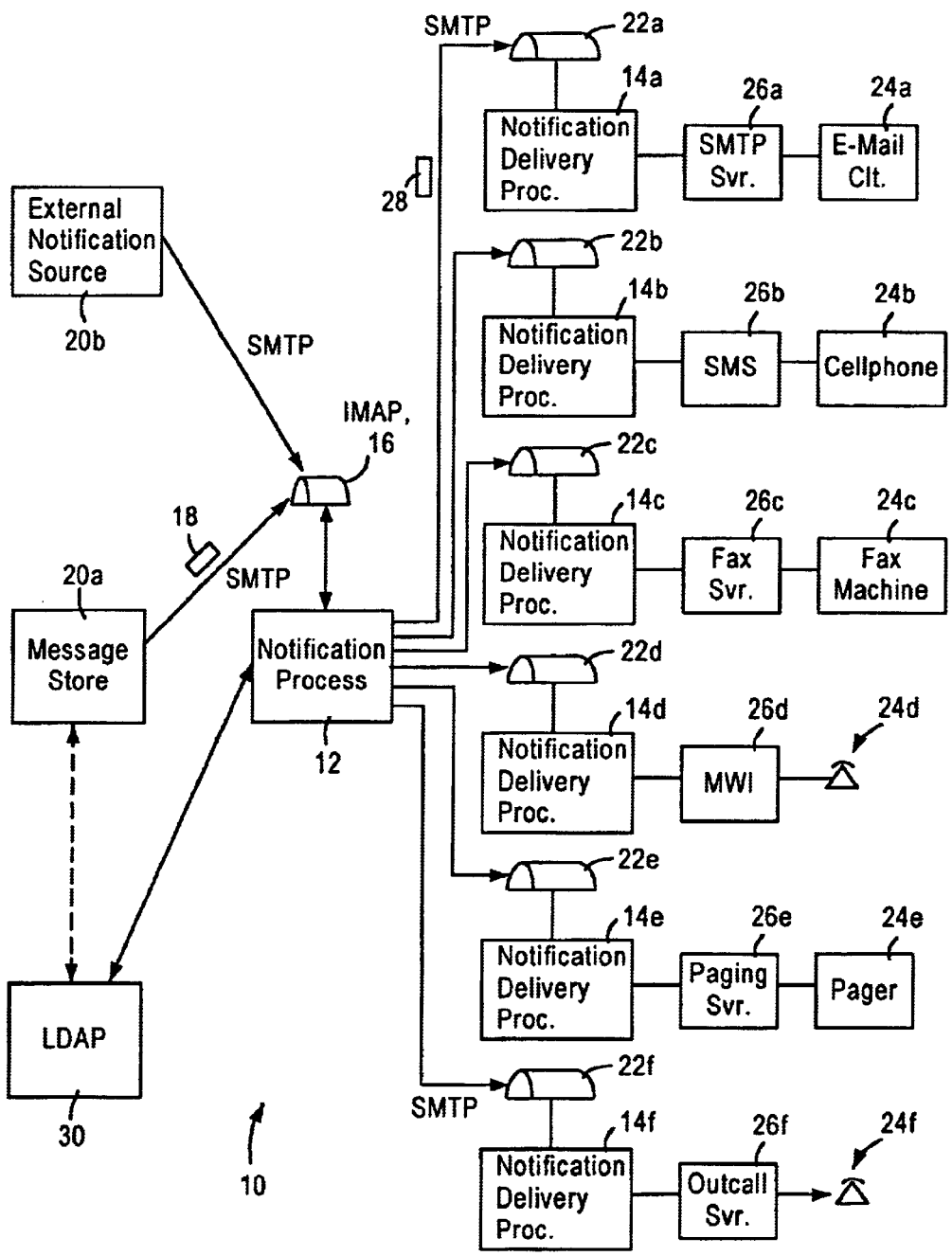
FIG. 1 is a block diagram illustrating deployment of a notification system for use with a unified messaging system according to an embodiment of the present invention.

FIG. 1 is a block diagram illustrating an architecture that provides unified notification services via an IP network according to an embodiment of the present invention. The notification system 10 includes a notification process 12 and multiple notification delivery processes 14. The notification process 12 has an associated SMTP-based mailbox 16, also referred to as the primary mailbox, configured for receiving generic notification messages 18 from notification sources 20, such as a unified messaging system 20*a* or an external notification source 20*b*. An exemplary implementation of the unified messaging system 20*a* is the commercially available Cisco Unified Open Network Exchange (Cisco uOne) (Products UONE-FOUND 4.1S, and UONE-VOICEMSG4.1S) from Cisco Systems, Inc. An example oft he external notification source 20*b* may be an e-mail server configured for automatically generating e-mail messages in response to a prescribed detected events, for example execution of a prescribed stock transaction, shipment of a customer order, etc.

Each notification delivery process 14 also has a corresponding SMTP based mailbox 22, referred to as a secondary mailbox, configured for receiving a corresponding notification delivery message 28. As described in detail below, each SMTP based mailbox 22 is configured for receiving according to SMTP protocol a corresponding notification delivery message 28 that specifies selected notification information to be utilized for notification according to a corresponding device-specific protocol. Although the notification delivery message 28 is typically sent by the notification process 12 according to accessed subscriber notification preferences, described below, the notification delivery message 28 may also be sent independently by the external notification service 20b if properly configured to supply the appropriate notification information according to the device-specific protocol.

Each notification delivery process 14 is configured for delivering a notification to a subscriber's notification device 24, according to a corresponding device protocol, based on reception of a notification delivery message 28 in its corresponding mailbox 22. For example, the notification delivery process 14a is configured for sending an SMTP-based notification to an e-mail client 24a using an SMTP server 26a for distribution of the selected notification information according to the protocol of the e-mail client 24a. Similarly, the notification delivery process 14b is configured for outputting an SMS-based message to the SMS server 26b for delivery to the subscriber's cellphone 24b. The notification delivery process 14c is configured for sending an outgoing facsimile transmission to a subscriber's fax machine 24c using a fax server 26c, and the notification delivery process 14d is configured for sending a command to the message waiting indicator server 26d for asserting a message waiting light on a subscriber's telephone 24d. The notification delivery process 14e is configured for sending a paging command to a paging server 26e for delivery of a wireless page to a subscriber's pager 24e, and the notification delivery process 14f is configured for requesting an outgoing call server 26d, for example a PBX or a voice over IP call controller, to place an outgoing call to a subscriber's telephone 24f used for notification (e.g., a home telephone or a secretary's telephone) in order to notify the subscriber of the event specified in the notification delivery message 28.

The notification process 12 is configured for outputting at least one notification delivery message 28 to a corresponding selected secondary mailbox 22 for delivery of a notification to the selected notification device 24 according to the corresponding protocol. In particular, the notification process 12 regularly polls the primary mailbox 16 for received messages from the message store 20a or the external notification service 20b, and obtains the notification messages according to IMAP protocol. According to the disclosed embodiment, the message store 20a outputs a notification message to the primary mailbox 16 for each message received by the message store 20. The notification message 18, illustrated in FIG. 2, specifies at least one notification recipient and notification information.

The notification process 12 generates the notification delivery message 28 and selects the notification delivery process 14 for delivery of notification information to the corresponding selected notification device 24 based on accessing subscriber attribute information that specifies the subscriber's notification preferences. In particular, the notification process 12, in response to detecting a notification message in the primary mailbox 16, accesses a subscriber directory according to LDAP protocol for retrieval of subscriber attribute information for each notification recipient specified in the notification message 12.

In particular, the notification process 12 will determine, for each notification recipient specified in the notification message 18, whether the notification recipient is a notification subscriber (i.e., subscribes to the notification service), and the subscriber notification preferences for the notification recipient. For example, the subscriber notification preferences may specify that the notification subscriber prefers an e-mail notification at a first prescribed time, an SMS based message at a second prescribed time, and a message waiting indicator (MWI) at all times. Note that the prescribed times for different notification devices may overlap, causing the notification process 12 to generate multiple device-specific notification delivery message 28 for a single notification message 18.

Figure 2:
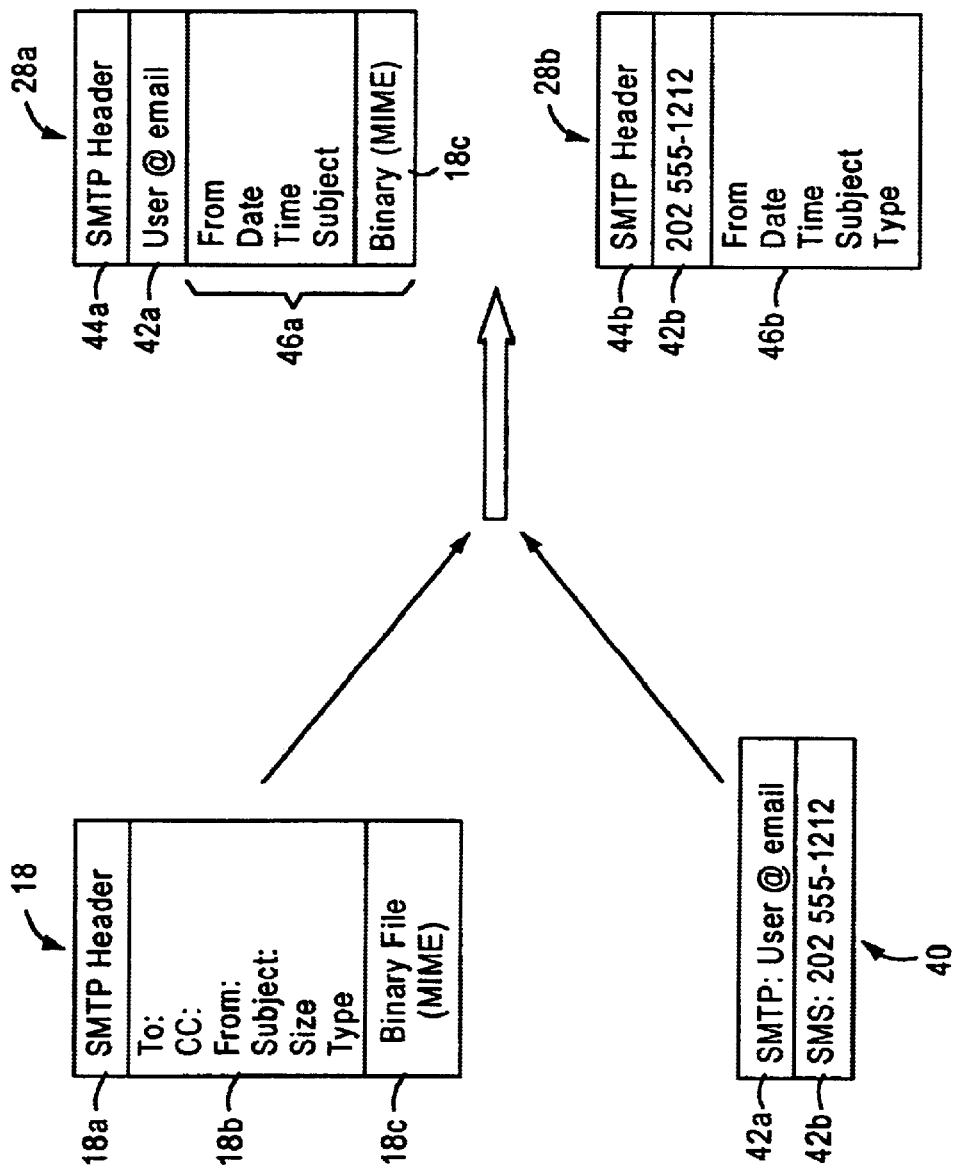
FIG. 2 is a diagram illustrating the generation of a notification delivery message by the notification process of FIG. 1 using selected portions of notification information and retrieved subscriber notification preference information according to an embodiment oft he present invention.

FIG. 2 is a diagram illustrating the generation of a notification delivery message 28 by the notification process of FIG. 1. The notification process 12 retrieves the subscriber notification preferences 40 from the LDAP directory 30, for example the destination addresses 42 of the corresponding notification devices to be used for notification. For example, the subscriber notification preferences 40 include key value pairs that specify an e-mail address 42a for the e-mail client 24a, and a cellular telephone number 42b of the subscriber's cellphone 24b for SMS notification by the SMS server 26b.

Upon retrieval of the subscriber notification preferences 40, the notification process 12 generates at least one notification delivery message 28 that specifies the destination address 42 of a corresponding notification device 24 for the notification recipient, and at least a corresponding selected portion 46 oft he notification information. In particular, the notification process 12 extracts selected portions of notification information 18b, 18c from the notification message 18 based on the notification device specified by the subscriber notification preference, and inserts the selected portions of the notification information into the notification delivery message 28. Items that may be extracted from the received notification message 18 include: the sender's e-mail address, the sender's telephone number, the sender's name, the subject of the message, the priority of the message, the message type (e-mail, a fax, voice mail), the date and time oft he message, the total size of the message, a text excerpt, and a MIME-encoded voice or fax attachment.

For example, the notification process 12 may generate the notification delivery message 28a for the notification delivery process 14a by including an SMTP header 44a that specifies the destination e-mail address of the secondary mailbox 22a, the subscriber information illustrated as the destination address 42a of the e-mail client 24a, and notification information 46a such as the source of the original message ("From"), date and time stamp, subject line, and a copy of the MIME encoded message attached as a binary file 18c in case the user wishes to play the message (in the case of a .wav file) or view the message (in the case of a tiff file). In addition, the notification process 12 may generate a notification delivery message 28b for the notification delivery process 14b by including an SMTP header 44b that specifies the destination e-mail address of the secondary mailbox 22b the subscriber information illustrated as the telephone number oft he cellphone 24b, and notification information 46b such as the source of the original message ("From"), date and time stamp, subject line, and message type. Note that the contents of the notification information 46b differs from the contents oft he notification information 46a based on the relative capabilities oft he notification devices 24b and 24a. Hence, the notification process 12 selects the notification information based on the capabilities of the notification device.

Figure 3:
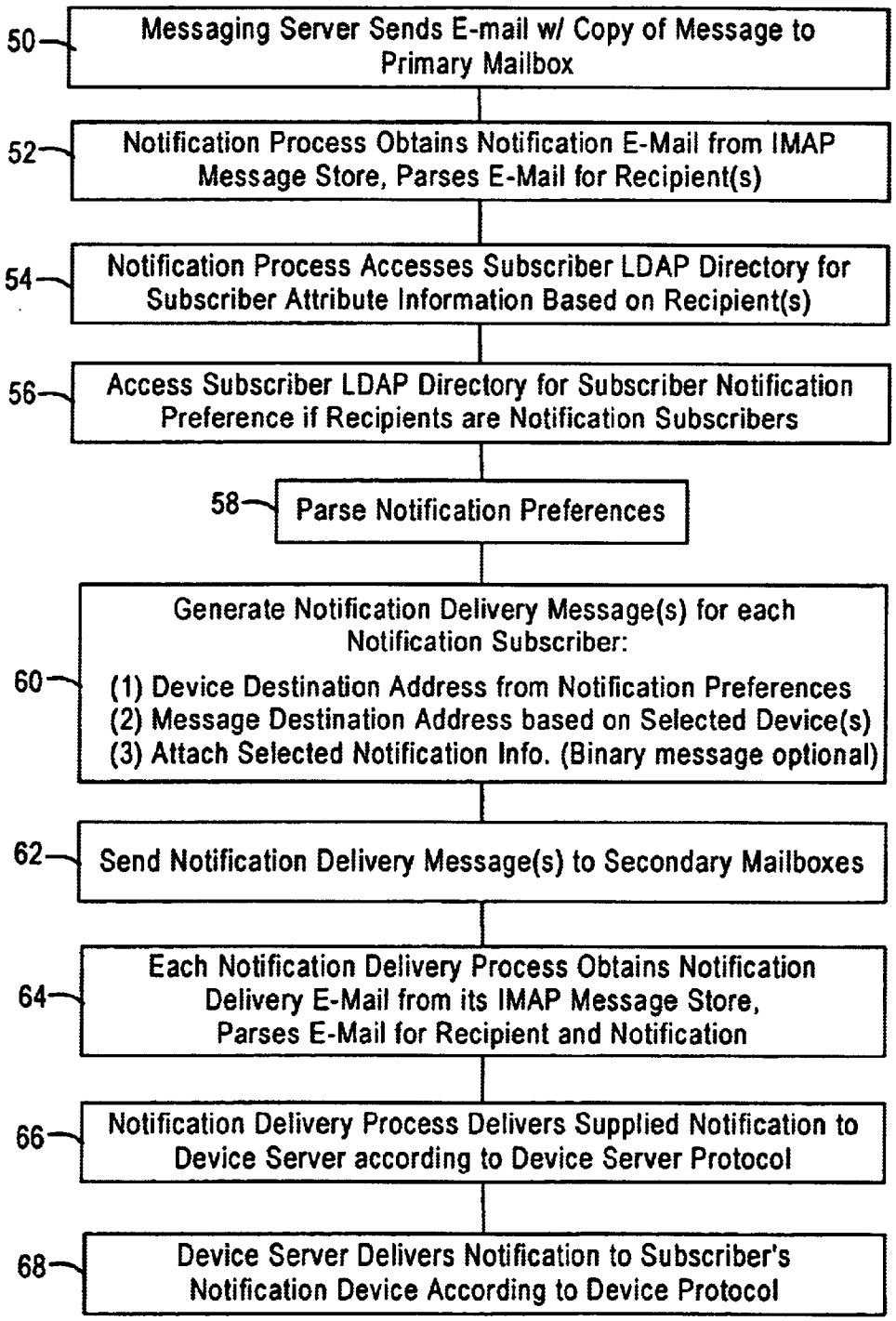
FIG. 3 is a diagram illustrating the notification method oft he notification system of FIG. 1 according to an embodiment of the present invention.

FIG. 3 is a diagram illustrating the notification method by the notification system 10 according to an embodiment of the present invention. The steps described in FIG. 3 can be implemented as executable code stored on a computer readable medium (e.g., a hard disk drive, a floppy drive, a random access memory, a read only memory, an EPROM, a compact disc, etc.). In addition, the notification process 12 and the notification delivery processes 14 may be implemented as executable routines within a single server, or distributed across multiple servers.

In addition, the disclosed architecture has the advantage that each of the processes 12 and 14 are scalable across multiple servers for large-scale deployment as multiprocess systems, where each process communicates with another process by sending SMTP-based messages. For example, multiple notification processes 12 may be arranged to serve respective groups of subscribers, where a first notification process (e.g., 12a) forwards a received notification message 18 to the primary mailbox 16 of a second notification process (e.g., 12b) if the first notification process 12a does not serve the subscriber specified-in the received notification message.

As shown in FIG. 3, the method begins in step 50 by the messaging server 20a or the external notification source 20b by sending the notification message 18 with a copy of the stored message (shown in FIG. 2 as portions 18b and 18c) to the primary mailbox 16 of the notification process 12. The notification process 12 regularly polls the primary mailbox 16, implemented within the IMAP message store, and obtains the notification message 18 in step 52 according to IMAP protocol and parses the notification message 18 for the notification recipients.

Upon identifying the notification recipients from the notification message 18, the notification process 12 accesses the subscriber LDAP directory 30 in step 54 to determine whether the notification recipients are valid notification subscribers. If the notification recipients are valid notification subscribers, the notification process 12 accesses the subscriber LDAP directory 30 in step 56 for the subscriber notification preferences 40 and all parameters associated with the device protocols to enable notification to the identified user device 24. If any notification recipient is not a valid notification subscriber, the process is dropped with respect to that notification recipient.

The notification process 12 parses the notification preferences 40 in step 58, and generates the notification delivery messages 28 for each notification subscriber in step 60. In particular, the notification process 12 determines for each notification device 24 the corresponding destination address 42, determines the message destination address for the corresponding secondary mailbox 22 based on the selected device, and attaches the selected notification information 46 based on the selected device. Typically the notification process 12 will access a local table that identifies the SMTP destination address for each oft he secondary mailboxes 22. The notification process 12 then sends the notification delivery messages 28 to the secondary mailboxes 22 in step 62.

Each notification delivery process 14 periodically polls its corresponding secondary mailbox 22 according to IMAP protocol, and in step 64 obtains its corresponding received notification delivery message 28 and parses the notification delivery message 28 for the destination address information 42 and the notification information 46. The notification delivery process 14 then delivers the supplied notification 46 to the corresponding associated device server 26 according to the device server protocol in step 66. For example, the notification delivery process 14a would send an e-mail message for transmission by the SMTP server 26a that specifies the destination address 42a of the e-mail client 24a and the notification information 46a as an attachment to the e-mail. The notification delivery process 14b, however, would send an SMS message to the SMS message server 26b that specifies the destination address 42b of the cellphone 24b and the text based notification information 46b for display on the subscribers cellphone 24b. The device server 26 would then send the notification message in step 68 to the corresponding subscriber device 24 according to the device specific protocol.

If notification to a device 24 should fail, the notification delivery process 14 schedules and performs any number of retries to the device 24. For example, the information about the message and the subscriber that still needs to be notified may be written to disk, plus the time at which the next retries should occur. Hence, each delivery process 14 processes any new incoming IMAP messages, and processes any needed retries.

Figure 4:
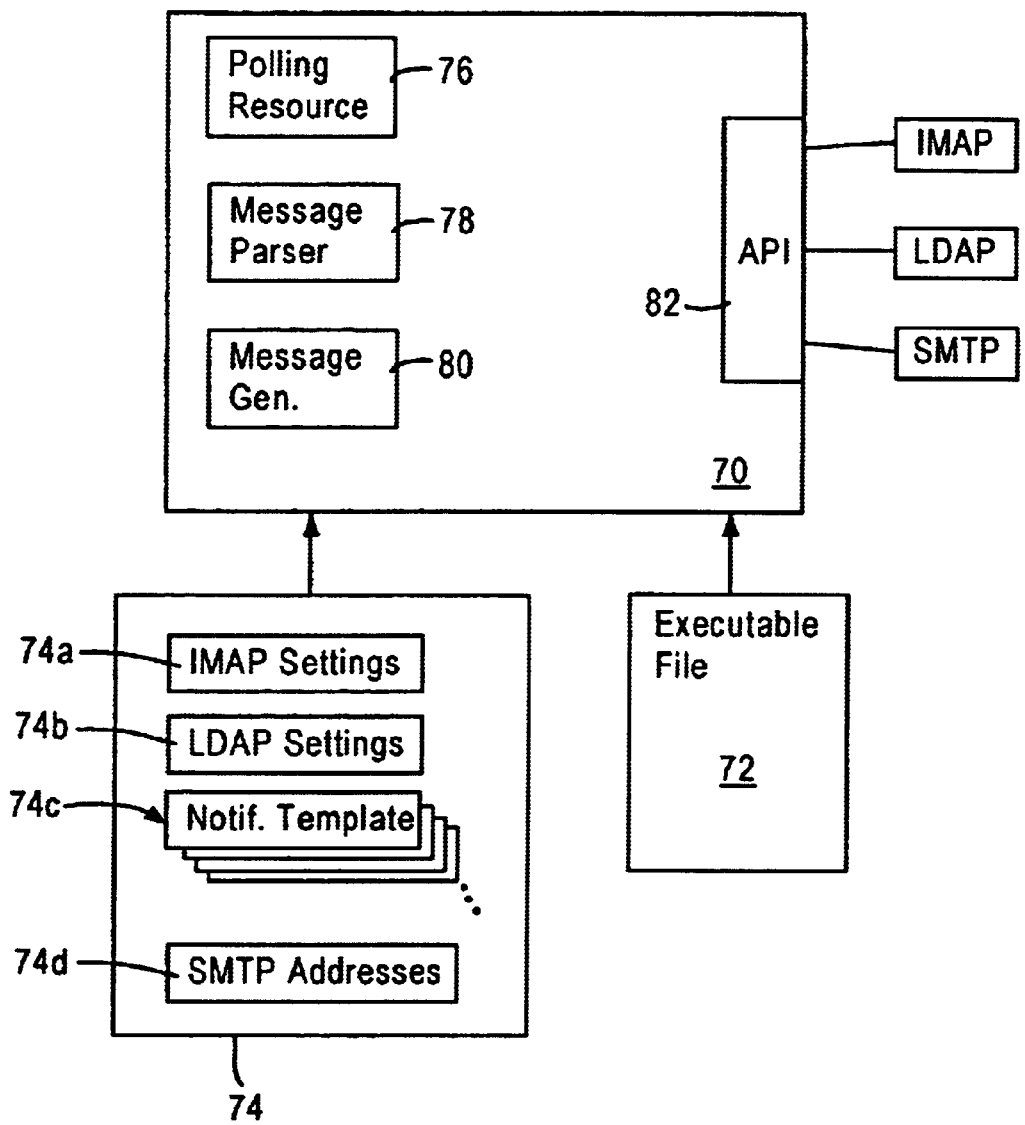
FIG. 4 is a diagram illustrating in detail the notification process of FIG. 1 according to an embodiment of the present invention.

FIG. 4 is a diagram illustrating in detail the notification process 12 according to an embodiment of the present invention. The notification process 12 is implemented as an application runtime environment 70 that executes sequences of instructions (as described with respect to FIG. 3) loaded from a tangible medium 72, and based on context-specific information loaded from an initialization file 74 during initialization of the process 12. In particular, the initialization file 74 includes parameters such as IMAP information 74a for accessing the primary IMAP message store 16, LDAP settings 74b for accessing the LDAP directory 30, notification templates 74c that specify parameters for generating the notification delivery messages 28, and SMTP-based addresses that identify the SMTP addresses of the secondary mailboxes 22.

As shown in FIG. 4, the application runtime environment 70 includes a polling resource 76 configured for issuing function calls at regular prescribed intervals for obtaining the notification messages 18 from the primary mailbox 16 according to IMAP protocol. The application runtime environment 70 also includes a message parser 78 configured for parsing the retrieved notification messages 18 for identification of the notification recipients.

The application runtime environment 70 also includes a message generator 80 configured for generating the notification delivery messages based on the subscriber notification preference information retrieved from the LDAP directory 30, and based on the notification information within the received notification message 18. The message generator 80 generates a notification delivery message 28 for a selected subscriber device 24 having selected portions of the notification information based on a corresponding protocol specific notification template 74c. In particular, the initialization file 74 includes a notification template 74c for each of the notification delivery processes 14: each notification template 74c specifies the relevant key-value pairs from the notification message 18 to be added to the notification delivery message 28 for the corresponding subscriber device 24. Hence, the message generator 80 utilizes a selected notification template 74c based on the subscriber device 24 specified in the subscriber notification preference information: if the subscriber preference specifies an e-mail client 24a, the message generator 80 utilizes an e-mail-specific specific template that specifies the key-value pairs of the notification information within the notification message 18 that should be included within the notification delivery message 28 to be sent to the secondary mailbox 22a; if the subscriber preference specifies an SMS-based client 24b, the message generator 80 utilizes an SMS-specific template that specifies the key-value pairs of the notification information within the notification message 18 that should be included within the notification delivery message 28 to be sent to the secondary mailbox 22b, etc. Hence, the message generator 80 is able to select portions of the notification information from the notification message 18 to be included in the notification delivery message 28 based on the subscriber device type 24 specified in the subscriber notification preference information.

The application runtime environment 70 also includes a set of libraries 82 that may be implemented as dynamically linked libraries (DLLs) or application programming interface (API) libraries. The libraries 82 enable the runtime environment 70 to implement procedure calls, such as issuing function calls to the IMAP directory 16 for retrieval of the notification messages 18, the LDAP directory 30 for retrieval of the subscriber notification preference information, and an SMTP server for sending the notification delivery messages 28.

According to the disclosed embodiment, a notification architecture is built upon the open standards of Internet Message Access Protocol (IMAP), Lightweight Directory Access Protocol (LDAP), and Simple Mail Transfer Protocol (SMTP). Hence, the notification architecture can be made available on a large number of platforms, and can be built upon any number of IMAP compliant messaging stores and LDAP compliant directory stores. In addition, the number of overall LDAP lookups is minimized, since the notification process 12, obtains all necessary information at one time for each of the notification delivery processes 14. In addition, network traffic is minimized since each notification delivery process 14 can receive selected portions of the original stored message as needed, as opposed to a complete copy. Finally, the notification process 12 and each of the notification delivery processes 14 are accessible by any SMTP source by sending an SMTP based message with the appropriate notification information to the appropriate mailbox 16 or 22. Hence, the same notification system 10 can be utilized to support unified messaging services by the message store 20a, while providing added value for external notification services 20b.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A method in a server, the method comprising:

obtaining a notification message having been sent from a notification source according to a first open network protocol, the notification message specifying at least one notification recipient and notification information;

accessing a subscriber directory, according to a second open network protocol for subscriber attribute information specifying subscriber notification preference for the specified at least one notification recipient;

generating, based on the subscriber notification preference, at least one notification delivery message that specifies a destination address of a corresponding notification device for the notification recipient and at least a corresponding selected portion of the notification information; and outputting, according to a third open network-protocol, the at least one notification delivery message to a selected corresponding at least one of a plurality of notification delivery processes for delivery oft he selected portion of the notification information to the notification device according to a corresponding device protocol.

2. The method of claim 1, wherein the obtaining step includes retrieving the notification message from an Simple Mail Transfer Protocol (SMTP)-based mailbox configured for receiving e-mail messages as notification messages for notification subscribers.

3. The method of claim 2, wherein the accessing step includes accessing the subscriber directory according to Lightweight Directory Access Protocol (LDAP) as the second open network protocol for the subscriber attribute information.

4. The method of claim 2, wherein the accessing step includes:

first accessing the subscriber directory according to LDAP protocol for determining whether the specified at least one notification recipient is a notification subscriber; and second accessing the subscriber directory according to LDAP protocol for the subscriber notification preference based on determining that the specified at least one notification recipient is a notification subscriber.

5. The method of claim 4, wherein the retrieving step includes retrieving the notification message according to Internet Message Access Protocol (IMAP) protocol as the first open network protocol.

6. The method of claim 4, wherein the generating step includes selectively attaching a MIME-encoded data structure obtained from the notification information into the selected portion of the notification information based on selection of the selected at least one notification delivery process.

7. The method of claim 6, wherein the selectively attaching step includes attaching the MIME-encoded data structure, carrying encoded audio data, based on selection of the selected at least one notification delivery process configured for initiating an audio-based notification.

8. The method of claim 4, wherein the generating step includes outputting the at least one notification delivery message according to SMTP protocol as the third open network protocol.

9. A method comprising the steps of:

obtaining by a notification process a notification message having been sent from a notification source according to a first open network protocol, the notification message specifying at least one notification recipient and notification information;

accessing by the notification process a subscriber directory, according to a second open network protocol, for subscriber attribute information specifying subscriber notification preference for the specified at least one notification recipient;

generating, based on the subscriber notification preference, at least one notification delivery message that specifies a destination address of a corresponding notification device for the notification recipient and at least a corresponding selected portion of the notification information;

outputting, according to a third open network protocol, the at least one notification delivery message by the notification process to a selected corresponding at least one of a plurality of notification delivery processes; and delivering by the selected at least one notification delivery process the corresponding selected portion of the notification information to the corresponding notification device according to a corresponding device protocol.

10. The method of claim 9, wherein the obtaining step includes retrieving the notification message from an Simple Mail Transfer Protocol (SMTP)-based mailbox configured for receiving e-mail messages as notification messages for notification subscribers.

11. The method of claim 10, wherein the accessing step includes accessing the subscriber directory according to Lightweight Directory Access Protocol (LDAP) as the second open network protocol for the subscriber attribute information.

12. The method of claim 10, wherein the accessing step includes:

first accessing the subscriber directory according to LDAP protocol for determining whether the specified at least one notification recipient is a notification subscriber; and second accessing the subscriber directory according to LDAP protocol for the subscriber notification preference based on determining that the specified at least one notification recipient is a notification subscriber.

13. The method of claim 12, wherein the retrieving step includes retrieving the notification message according to Internet Message Access Protocol (IMAP) protocol as the first open network protocol.

14. The method of claim 9, wherein the outputting step includes sending the at least one notification delivery message according to SMTP protocol to a corresponding at least one mailbox for the corresponding selected at least one notification delivery process.

15. The method of claim 14, wherein the delivering step by each selected notification delivery process includes:

accessing the notification delivery message from the corresponding mailbox according to Internet Message Access Protocol (IMAP) protocol;

parsing the notification delivery message for the corresponding selected portion of the notification information and a destination address of the corresponding notification device; and sending the selected portion oft he notification information to the corresponding notification device according to the corresponding device protocol.

16. The method of claim 15, wherein the sending step includes sending the selected portion using one of at least a Short Message Service (SMS), SMTP, a paging protocol, an outbound audio call protocol, an outbound fax call protocol, and a message waiting indicator protocol, as the corresponding device protocol.

17. The method of claim 15, wherein the sending step includes outputting the selected portion to a device server, configured for supplying the selected portion to the device according to the corresponding device protocol, according to a corresponding device server protocol.

18. A notification system comprising:

means for obtaining a notification message having been sent from a notification source according to a first open network protocol, the notification message specifying at least one notification recipient and notification information;

means for accessing a subscriber directory, according to a second open network protocol, for subscriber attribute information specifying subscriber notification preference for the specified at least one notification recipient;

means for generating, based on the subscriber notification preference, at least one notification delivery message that specifies a destination address of a corresponding notification device for the notification recipient and at least a corresponding selected portion of the notification information; and means for outputting, according to a third open network protocol, the at least one notification delivery message to a selected corresponding at least one of a plurality of notification delivery processes for delivery oft he selected portion oft he notification information to the notification device according to a corresponding device protocol.

19. The system of claim 18, wherein the obtaining means retrieves the notification message from an Simple Mail Transfer Protocol (SMTP)-based mailbox configured for receiving e-mail messages as notification messages for notification subscribers.

20. The system of claim 19, wherein the accessing means accesses the subscriber directory according to Lightweight Directory Access Protocol (LDAP) as the second open network protocol for the subscriber attribute information.

21. The system of claim 19, wherein the accessing means is configured for first accessing the subscriber directory according to LDAP protocol for determining whether the specified at least one notification recipient is a notification subscriber, and second accessing the subscriber directory according to LDAP protocol for the subscriber notification preference based on determining that the specified at least one notification recipient is a notification subscriber.

22. The system of claim 21, wherein the retrieving means is configured for retrieving the notification message according to Internet Message Access Protocol (IMAP) protocol as the first open network protocol.

23. A notification system comprising:

a notification process configured for:

(1) obtaining a notification message having been sent from a notification source according to a first open network protocol, each notification message specifying at least one notification recipient and notification information, (2) accessing a subscriber directory according to a second open network protocol for subscriber notification preference information for the at least one notification recipient, (3) generating at least one notification delivery message that specifies a destination address of a corresponding notification device for the notification recipient and at least a corresponding selected portion of the notification information based on the subscriber notification preference information, and (4) outputting the at least one notification delivery message according to a third open network protocol; and a plurality of notification delivery processes, each configured for delivering a notification to a subscriber device according to a corresponding device protocol based on a corresponding received notification delivery message.

24. The system of claim 23, wherein the notification process is configured for obtaining the notification message from an SMTP-based mailbox configured for receiving e-mail messages as notification messages for notification subscribers.

25. The system of claim 24, wherein the notification process is configured for obtaining the notification message from the SMTP-based mailbox according to Internet Message Access Protocol (IMAP) protocol as the first open network protocol.

26. The system of claim 25, wherein the notification process is configured for accessing the subscriber directory according to LDAP protocol as the second open network protocol.

27. The system of claim 23, wherein the notification process is configured for outputting the at least one notification delivery message according to SMTP protocol as the third open network protocol.

28. The system of claim 23, further comprising a primary SMTP-based mailbox for receiving the notification message from the notification source, the notification process configured for periodically obtaining the notification message according to Internet Message Access Protocol (IMAP) protocol.

29. The system of claim 28, further comprising secondary SMTP-based mailboxes configured for receiving the notification delivery messages for the respective notification delivery processes, each notification delivery process accessing its corresponding secondary SMTP-based mailbox for the corresponding notification delivery message.

30. The system of claim 23, wherein the notification process selects at least one of the notification delivery processes for receipt of the corresponding at least one notification delivery message based on the notification preference information.

31. A computer readable medium having stored thereon sequences of instructions for notifying a subscriber, the sequences of instructions including instructions for performing the steps of:
   obtaining a notification message having been sent from a notification source according to a first open network protocol, the notification message specifying at least one notification recipient and notification information;
   accessing a subscriber directory, according to a second open network protocol, for subscriber attribute information specifying subscriber notification preference for the specified at least one notification recipient;
   generating, based on the subscriber notification preference, at least one notification delivery message that specifies a destination address of a corresponding notification device for the notification recipient and at least a corresponding selected portion of the notification information; and
   outputting, according to a third open network protocol, the at least one notification delivery message to a selected corresponding at least one of a plurality of notification delivery processes for delivery of the selected portion of the notification information to the notification device according to a corresponding device protocol.

32. The medium of claim 31, wherein the obtaining step includes retrieving the notification message from an Simple Mail Transfer Protocol (SMTP)-based mailbox configured for receiving e-mail messages as notification messages for notification subscribers.

33. The medium of claim 32, wherein the accessing step includes accessing the subscriber directory according to Lightweight Directory Access Protocol (LDAP) as the second open network protocol for the subscriber attribute information.

34. The medium of claim 32, wherein the accessing step includes:
   first accessing the subscriber directory according to LDAP protocol for determining whether the specified at least one notification recipient is a notification subscriber; and
   second accessing the subscriber directory according to LDAP protocol for the subscriber notification preference based on determining that the specified at least one notification recipient is a notification subscriber.

35. The medium of claim 34, wherein the retrieving step includes retrieving the notification message according to Internet Message Access Protocol (IMAP) protocol as the first open network protocol.

36. The medium of claim 34, wherein the generating step includes selectively attaching a MIME-encoded data structure obtained from the notification information into the selected portion of the notification information based on selection of the selected at least one notification delivery process.

37. The medium of claim 36, wherein the selectively attaching step includes attaching the MIME-encoded data structure, carrying encoded audio data, based on selection of the selected at least one notification delivery process configured for initiating an audio-based notification.

38. The medium of claim 34, wherein the generating step includes outputting the at least one notification delivery message according to SMTP protocol as the third open network protocol.

39. A computer readable medium having stored thereon sequences of instructions for notifying a subscriber, the sequences of instructions including instructions for performing the steps of:
   obtaining by a notification process a notification message having been sent from a notification source according to a first open network protocol, the notification message specifying at least one notification recipient and notification information;
   accessing by the notification process a subscriber directory, according to a second open network protocol, for subscriber attribute information specifying subscriber notification preference for the specified at least one notification recipient;
   generating, based on the subscriber notification preference, at least one notification delivery message that specifies a destination address of a corresponding notification device for the notification recipient and at least a corresponding selected portion of the notification information;
   outputting, according to a third open network protocol, the at least one notification delivery message by the notification process to a selected corresponding at least one of a plurality of notification delivery processes; and
   delivering by the selected at least one notification delivery process the corresponding selected portion of the notification information to the corresponding notification device according to a corresponding device protocol.

40. The medium of claim 39, wherein the obtaining step includes retrieving the notification message from an Simple Mail Transfer Protocol (SMTP)-based mailbox configured for receiving e-mail messages as notification messages for notification subscribers.

41. The medium of claim 40, wherein the accessing step includes accessing the subscriber directory according to Lightweight Directory Access Protocol (LDAP) as the second open network protocol for the subscriber attribute information.

42. The medium of claim 40, wherein the accessing step includes:
   first accessing the subscriber directory according to LDAP protocol for determining whether the specified at least one notification recipient is a notification subscriber; and
   second accessing the subscriber directory according to LDAP protocol for the subscriber notification preference based on determining that the specified at least one notification recipient is a notification subscriber.

43. The medium of claim 42, wherein the retrieving step includes retrieving the notification message according to Internet Message Access Protocol (IMAP) protocol as the first open network protocol.

44. The medium of claim 39, wherein the outputting step includes sending the at least one notification delivery message according to SMTP protocol to a corresponding at least one mailbox for the corresponding selected at least one notification delivery process.

45. The medium of claim 44, wherein the delivering step by each selected notification delivery process includes:
   accessing the notification delivery message from the corresponding mailbox according to Internet Message Access Protocol (IMAP) protocol;
   parsing the notification delivery message for the corresponding selected portion of the notification information and a destination address of the corresponding notification device; and
   sending the selected portion oft he notification information to the corresponding notification device according to the corresponding device protocol.

46. The medium of claim 45, wherein the sending step includes sending the selected portion using one of at least a Short Message Service (SMS), SMTP, a paging protocol, an outbound audio call protocol, an outbound fax call protocol, and a message waiting indicator protocol, as the corresponding device protocol.

47. The medium of claim 45, wherein the sending step includes outputting the selected portion to a device server, configured for supplying the selected portion to the device according to the corresponding device protocol, according to a corresponding device server protocol.

48. A notification server comprising:
   a first resource configured for periodically retrieving, from a primary message store, a notification message having been sent from a notification source according to a first open network protocol, the notification message specifying at least one notification recipient and notification information; and
   a message generator configured for obtaining, from a subscriber directory according to a second open network protocol, subscriber attribute information specifying subscriber notification preference for the specified at least one notification recipient, the message generator configured for generating at least one notification delivery message that specifies a destination address of a corresponding notification device for the notification recipient and at least a corresponding selected portion of the notification information, the message generator outputting the at least one notification delivery message to a selected corresponding at least one of a plurality of notification delivery processes for delivery of the selected portion oft he notification information to the notification device according to a corresponding device protocol.

49. The server ofclaim 48, wherein the first resource retrieves the notification message according to Internet Message Access Protocol (IMAP) protocol.

50. The server of claim 48, wherein the message generator is configured for accessing the subscriber attribute information by issuing a function call to a prescribed resource.

51. The server of claim 48, wherein the message generator selects the portion of the. notification information based on a group of key value pairs specified by a notification template loaded during initialization of the message generator.

52. The method of claim 1, wherein the notification message specifies multiple notification recipients, the accessing including retrieving, in a single access operation, the respective subscriber notification preferences from the subscriber directory according to Lightweight Directory Access Protocol (LDAP) as the second open network protocol.

53. The method of claim 9, wherein the notification message specifies multiple notification recipients, the accessing including retrieving, in a single access operation, the respective subscriber notification preferences from the subscriber directory according to Lightweight Directory Access Protocol (LDAP) as the second open network protocol.

54. The system of claim 18, wherein the notification message specifies multiple notification recipients, the accessing means configured for retrieving, in a single access operation, the respective subscriber notification preferences from the subscriber directory according to Lightweight Directory Access Protocol (LDAP) as the second open network protocol.

55. The system of claim 23, wherein the notification message specifies multiple notification recipients, the notification process configured for accessing the subscriber directory by retrieving, in a single access operation, the respective subscriber notification preferences from the subscriber directory according to Lightweight Directory Access Protocol (LDAP) as the second open network protocol.

56. The medium of claim 31, wherein the notification message specifies multiple notification recipients, the accessing including retrieving, in a single access operation, the respective subscriber notification preferences from the subscriber directory according to Lightweight Directory Access Protocol (LDAP) as the second open network protocol.

57. The medium of claim 39, wherein the notification message specifies multiple notification recipients, the accessing including retrieving, in a single access operation, the respective subscriber notification preferences from the subscriber directory according to Lightweight Directory Access Protocol (LDAP) as the second open network protocol.

58. The server of claim 48, wherein the notification message specifies multiple notification recipients, the message generator configured for retrieving, in a single access operation, the respective subscriber notification preferences from the subscriber directory according to Lightweight Directory Access Protocol (LDAP) as the second open network protocol.

* * * * *

UNITED STATES PATENT AND TRADEMARK OFFICE
CERTIFICATE OF CORRECTION

PATENT NO.    : 6,665,378 B1
DATED         : December 16, 2003
INVENTOR(S)   : Spielman et al.

It is certified that error appears in the above-identified patent and that said Letters Patent is hereby corrected as shown below:

Column 9,
Line 65, after "protocol" insert -- , --

Column 10,
Line 10, delete "oft he" and insert -- of the --

Column 12,
Lines 17 and 18, delete "oft he" and insert -- of the --

Signed and Sealed this

Third Day of February, 2004

JON W. DUDAS
*Acting Director of the United States Patent and Trademark Office*